United States Patent
Roush et al.

(10) Patent No.: US 9,068,507 B2
(45) Date of Patent: Jun. 30, 2015

(54) COMPRESSOR HAVING PURGE CIRCUIT AND METHOD OF PURGING

(75) Inventors: Eric David Roush, Simpsonville, SC (US); Tushar Sharadchandra Desai, Greer, SC (US); Charles Alexander Smith, Greenville, SC (US)

(73) Assignee: General Electric Company, Schenectady, NY (US)

(*) Notice: Subject to any disclaimer, the term of this patent is extended or adjusted under 35 U.S.C. 154(b) by 893 days.

(21) Appl. No.: 13/297,354

(22) Filed: Nov. 16, 2011

(65) Prior Publication Data

US 2013/0121803 A1  May 16, 2013

(51) Int. Cl.
*F02C 7/12* (2006.01)
*F02C 6/08* (2006.01)
*F04D 29/32* (2006.01)
*F04D 29/58* (2006.01)

(52) U.S. Cl.
CPC ... *F02C 7/12* (2013.01); *F02C 6/08* (2013.01); *F04D 29/321* (2013.01); *F04D 29/584* (2013.01)

(58) Field of Classification Search
CPC .............. F04D 27/009; F04D 27/0207; F04D 27/0215; F04D 27/0223; F04D 27/023; F04D 27/0238; F04D 29/5846; F04D 29/682; F04D 29/684; F01D 25/08; F01D 25/12; F02C 7/12; F02C 6/08
USPC ............ 415/52.1, 27.1, 58.4, 58.5, 58.7, 115, 415/144, 145, 169.1, 175, 176
See application file for complete search history.

(56) References Cited

U.S. PATENT DOCUMENTS

| | | | |
|---|---|---|---|
| 5,271,711 A | 12/1993 | McGreehan et al. | |
| 6,574,965 B1 * | 6/2003 | Feulner | 60/785 |
| 2006/0153673 A1 * | 7/2006 | Guemmer | 415/115 |
| 2010/0178168 A1 | 7/2010 | Desai et al. | |
| 2010/0281875 A1 * | 11/2010 | Price et al. | 60/772 |

* cited by examiner

*Primary Examiner* — Dwayne J White
*Assistant Examiner* — Adam W Brown
(74) *Attorney, Agent, or Firm* — Hoffman Warnick LLC; Ernest G. Cusick

(57) ABSTRACT

A compressor having a purge circuit. In one embodiment, the compressor includes: a rotor having a plurality of stages, each of the plurality of stages including a set of radially extending rotor wheels; a working fluid supply path for providing working fluid to each of the plurality of stages for compression by each set of radially extending rotor wheels; a purge circuit for diverting a first portion of the working fluid from an upstream portion of the working fluid supply path to at least one downstream stage of the plurality of stages; and a substantially axial bypass path bypassing the at least one downstream stage, the substantially axial bypass path for diverting a second portion of the working fluid around the at least one downstream stage.

9 Claims, 3 Drawing Sheets

COMPRESSOR HAVING PURGE CIRCUIT AND METHOD OF PURGING

BACKGROUND OF THE INVENTION

The subject matter disclosed herein relates generally to a compressor having a purge circuit and methods of purging (cooling) a compressor. More particularly, the subject matter disclosed herein relates to a purge circuit, and methods of using that purge circuit, for controlling thermally induced stresses in an aft end of a compressor.

In a conventional gas turbine system, a compressor is coupled to a turbine to provide compressed air for enhanced combustion of the gas fuel in a combustor. During operation of this gas turbine system, the compressor is subject to operating temperatures that can induce thermal stresses on the compressor material. As such, the compressor's components are subject to low cycle fatigue (LCF), embrittlement and creep issues, which can negatively affect the performance of the gas turbine system.

BRIEF DESCRIPTION OF THE INVENTION

A compressor having a purge circuit is disclosed. In one embodiment, the compressor includes: a rotor having a plurality of stages, each of the plurality of stages including a set of radially extending rotor wheels; a working fluid supply path for providing working fluid to each of the plurality of stages for compression by each set of radially extending rotor wheels; a purge circuit for diverting a first portion of the working fluid from an upstream portion of the working fluid supply path to at least one downstream stage of the plurality of stages; and a substantially axial bypass path bypassing the at least one downstream stage, the substantially axial bypass path for diverting a second portion of the working fluid around the at least one downstream stage.

A first aspect of the invention includes a compressor having a purge circuit. The compressor includes: a rotor having a plurality of stages, each of the plurality of stages including a set of radially extending rotor wheels; a working fluid supply path for providing working fluid to each of the plurality of stages for compression by each set of radially extending rotor wheels; a purge circuit for diverting a first portion of the working fluid from an upstream portion of the working fluid supply path to at least one downstream stage of the plurality of stages; and a substantially axial bypass path bypassing the at least one downstream stage, the substantially axial bypass path for diverting a second portion of the working fluid around the at least one downstream stage.

A second aspect of the invention includes a gas turbine system having: a turbine; and a compressor fluidly connected to the turbine, the compressor including: a rotor having a plurality of stages, each of the plurality of stages including a set of radially extending rotor wheels; a working fluid supply path for providing working fluid to each of the plurality of stages for compression by each set of radially extending rotor wheels; a purge circuit for diverting a first portion of the working fluid from an upstream portion of the working fluid supply path to at least one downstream stage of the plurality of stages; and a substantially axial bypass path bypassing the at least one downstream stage, the substantially axial bypass path for diverting a second portion of the working fluid around the at least one downstream stage.

A third aspect of the invention includes A method of cooling a compressor, the method including: providing working fluid to each of a plurality of stages in the compressor from a working fluid supply path; diverting a first portion of the working fluid from an upstream portion of the working fluid supply path to at least one downstream stage of the plurality of stages; and diverting a second portion of the working fluid around the at least one downstream stage.

BRIEF DESCRIPTION OF THE DRAWINGS

These and other features of this invention will be more readily understood from the following detailed description of the various aspects of the invention taken in conjunction with the accompanying drawings that depict various embodiments of the invention.

Figure 1:
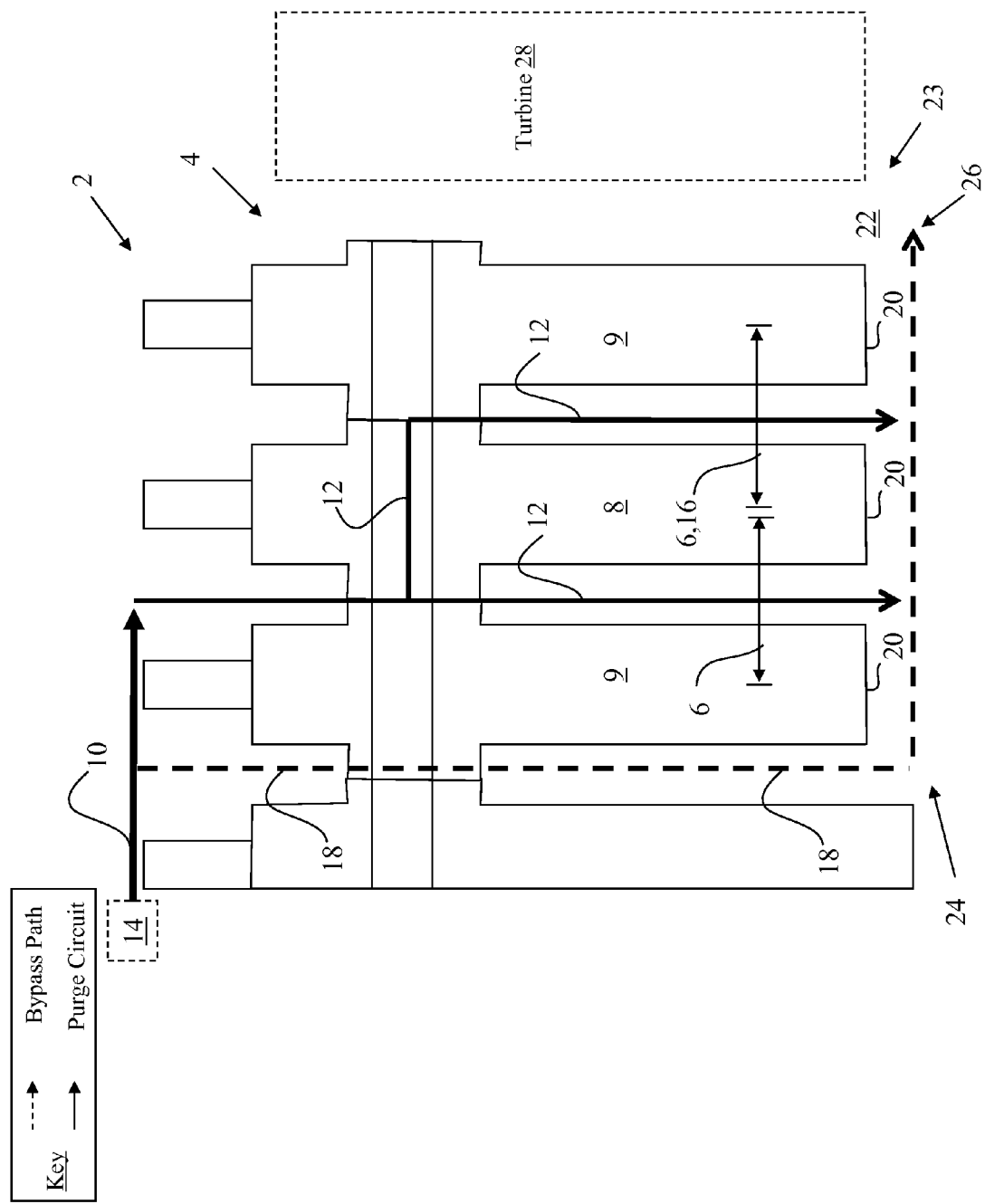
FIG. 1 shows a cross-sectional view of a portion of a compressor according to aspects of the invention.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

The subject matter disclosed herein relates generally to a compressor purge circuit and methods of purging (cooling) a compressor. More particularly, the subject matter disclosed herein relates to a purge circuit, and methods of using that purge circuit, for controlling thermally induced stresses in the aft end of a compressor.

In a conventional gas turbine system, a compressor is coupled to a turbine to provide compressed air for enhanced combustion of the gas fuel in a combustor. During operation of this gas turbine system, the compressor is subject to operating temperatures that can induce thermal stresses on the compressor material. As such, the compressor's components are subject to low cycle fatigue (LCF), embrittlement and creep issues, which can negatively affect the performance of the gas turbine system. In particular, areas at the aft (or, back, or discharge) end of the compressor are subject to high temperatures, pressures and air flow rates due to their proximity to the exhaust of the compressor. The high temperature and pressure of this exhaust air, coupled with its velocity, can rapidly and substantially heat the rotor wheels during operation of the compressor. Conventionally, this problem has been addressed either by introducing higher-strength (and more expensive) materials at this portion of the compressor to withstand these high temperatures, pressures and flow rates, or by introducing cooling fluid via an external fluid source (such as a cooled cooling air (CCA)). Both of these approaches can be expensive and unnecessarily complex.

In contrast to conventional approaches, aspects of the invention include a compressor purge circuit which uses forward compressor-stage air to purge aft-end rotor cavities and wheels. This forward compressor-stage air (or, working fluid) is directed axially aftward and radially outward through the compressor along the faces and outer diameters, respectively, of the rotor wheels and buckets (or, nozzles). This forward compressor-stage air helps control the bulk temperature of those rotor wheels and buckets which it contacts. After cooling the rotor wheels and buckets (or, stages), this forward compressor-stage air is joined with bypassed working fluid (or, bucket supply air), and either recycled through the system or sent to the turbine, e.g., for cooling of turbine buckets.

Generally speaking, aspects of the invention include a purge circuit that diverts cooler forward-stage compressor air to the compressor's rotor wheels/buckets in the hotter, aft portion of the compressor. This diverted air is further divided to flow around respective wheels/buckets, enhancing its cooling effect. Further, after using this diverted air to cool the rotor wheels/buckets, it is joined with the bucket supply air for use in, for example, cooling turbine buckets in a turbine. Aspects of the invention help control some negative effects associated with overheating compressor wheels, while reducing the need to employ high-cost materials in the compressor.

As used herein, and as is known in the art, the terms "upstream" and "downstream" generally refer to relative positions along a fluid flow path in a compressor or turbine section. That is, a first location "upstream" of a second location will encounter a portion of fluid (e.g., working fluid) prior to the second location. The upstream location is closer to the inlet of the machine (e.g., the compressor) than a downstream location in that machine. As further used herein, the term "set" and the term "group" can refer to one or more elements, such that a "set" or a "group" of elements includes at least one of those elements.

In one particular aspect of the invention, a compressor is disclosed including a purge circuit for diverting upstream air (e.g., 11th stage air) to purge cavities between the rotor's wheels between the upstream point (e.g., the 11th stage) and a designated downstream location (e.g., the 14th stage). This purge circuit diverts the upstream air radially outward through each respective cavity, where that flow is rejoined with turbine bucket supply air (or, exhaust air) diverted from upstream (e.g., upstream of the 11th stage). That turbine bucket supply air is diverted along an axially extending passageway, where it is joined with the diverted air for delivery to the turbine. The axially extending passageway can extend along the outer diameters, respectively, of the rotor wheels and nozzles in successive stages, and can feed an outlet of the compressor.

In one particular aspect of the invention, a compressor is disclosed including: a rotor having a plurality of stages, each of the plurality of stages including a set of radially extending rotor wheels; a working fluid supply path for providing working fluid to each of the plurality of stages for compression by each set of radially extending rotor wheels; a purge circuit for diverting a first portion of the working fluid from an upstream portion of the working fluid supply path to at least one (of a group) downstream stage of the plurality of stages; and a substantially axial bypass path bypassing the at least one downstream stage (e.g., by extending along a radial outer dimension of each of the at least one downstream stage) of the plurality of stages, the substantially axial bypass path for diverting a second portion of the working fluid around the at least one downstream stage.

Turning to FIG. 1, a cross-sectional view of a portion of a compressor 2 is shown according to aspects of the invention. As shown the compressor 2 can include a rotor 4 having a plurality of stages 6. As is known in the art, each of the plurality of stages 6 of the rotor 4 can include a set of radially extending rotor wheels 8 (only one wheel in each set visible from this cross-section) and a set of radially extending static buckets (or, nozzles) 9. Also shown, the compressor 2 can include a working fluid supply path 10 for providing working fluid (e.g., air) to each of the plurality of stages 6 for compression by each set of radially extending rotor wheels 8. Also shown, the compressor 2 includes a purge circuit 12 for diverting a first portion of the working fluid from an upstream portion 14 of the working fluid supply path 10 to at least one stage 6 of a group 16 of downstream stages of the plurality of stages 6. The compressor 2 can also include a substantially axial bypass path 18 bypassing the at least one downstream stage in the group 16. In some cases, the substantially axial bypass path 18 can extend along a radial outer dimension (or, edge) 20 of the at least one downstream stages (of the group 16) of the plurality of stages 6. The substantially axial bypass path 18 can be used for diverting a second portion of the working fluid around the group of downstream stages 16, bypassing those stages of the compressor 2.

In some embodiments, the upstream portion 14 of the working fluid supply path 10 is a numbered stage 6 of the compressor 2 proximate an outlet 22 of the compressor 2, near the compressor's 2 aft, or back end 23. More specifically, in some cases, the upstream portion 14 of the working fluid supply path 10 includes, or is located proximate to, an eleventh stage of the compressor 2 having a total of 14 stages. In this embodiment, the downstream stages 16 can include one or more of a twelfth, a thirteenth or a fourteenth stage 6 of the compressor 2.

It is understood that the eleventh stage is merely one example of a stage from which working fluid can be extracted according to embodiments of the invention. In the 14-stage compressor 2 shown and described herein, the working fluid extracted from the eleventh stage is characterized by a desirable balance in fluid pressure and temperature to achieve the targeted cooling effects. That is, in the 14-stage compressor 2 example, the working fluid at the eleventh stage is of sufficiently high pressure to flow to the desired downstream cooling locations, while having a low enough temperature to effectively cool those downstream cooling locations. It is understood that in other embodiments, working fluid could be extracted from any stage of a compressor where that working fluid could provide sufficient heat transfer and flow to a downstream cooling location.

As shown in FIG. 1, in some embodiments, the axial bypass path 18 can be fluidly connected with the purge circuit 12, such that portions of the purge circuit 12 can feed into the axial bypass path 18. As its name suggests, the axial bypass path 18 helps to divert (or bypass) a portion of the working fluid from a location 24 upstream of the purge circuit 12 to a second location 26 downstream of the group of downstream stages 16. The axial bypass path 18 can extend along the outer dimensions (or, the radially outward portions) 20 of the downstream stages 16, respectively.

The axial bypass path 18 can exit the compressor 2 at the outlet 22, and may be supplied to a turbine 28 (shown schematically in phantom) for use as bucket supply fluid for cooling buckets in the turbine 28. The axial bypass path 18 is fluidly connected with outlet 22 of the compressor 2, which can be fluidly connected with an inlet (not shown) of the turbine 28. As is known in the art, the compressor 2 and turbine 28 can be housed within a single enclosure (e.g., a shared casing), or may be fluidly connected via external conduits. In any case, the axial bypass path 18 can provide bucket supply fluid to the turbine 28 for use in cooling turbine buckets (not shown).

Figure 2:
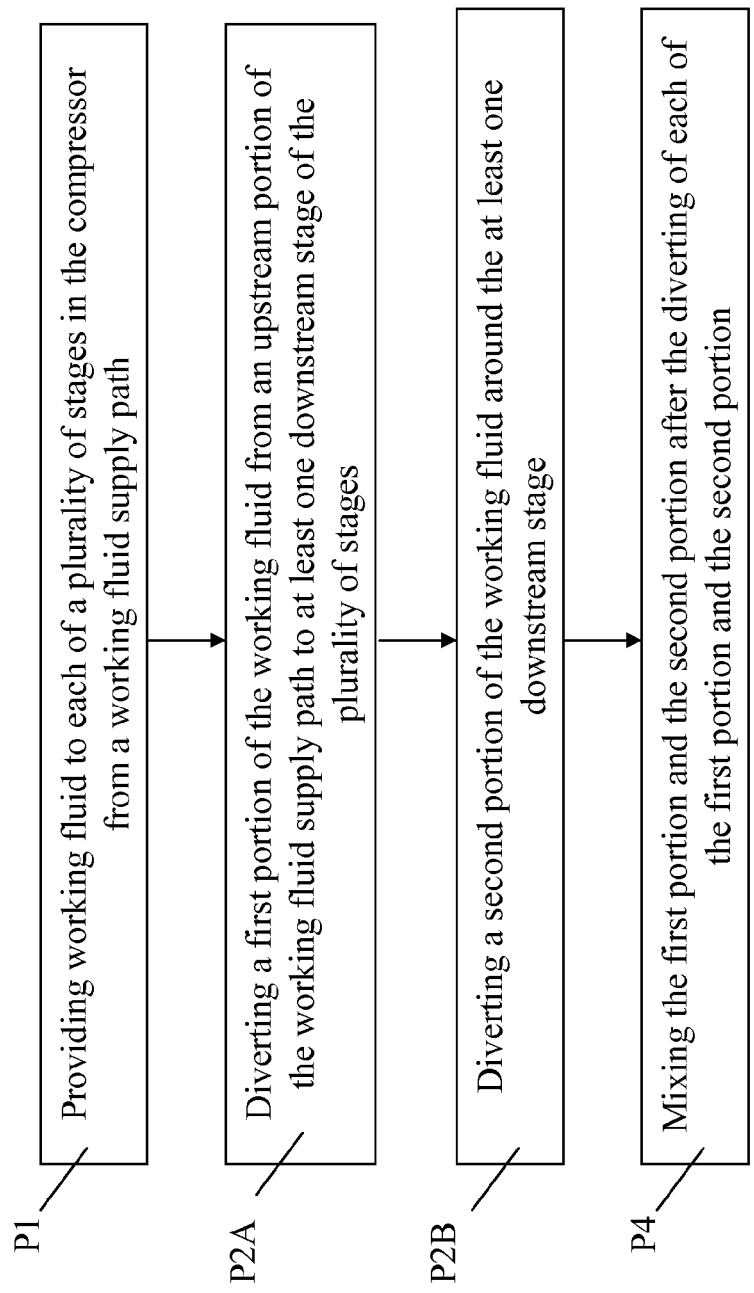
FIG. 2 illustrates processes in a method flow according to aspects of the invention.

FIG. 2 illustrates processes in a method flow according to aspects of the invention. The method can include cooling a compressor (e.g., compressor 2). As shown, a first process P1 can include: providing working fluid to each of a plurality of stages 6 in the compressor 2 from a working fluid supply path 10. Process P2A can include diverting a first portion of the working fluid from an upstream portion 14 of the working fluid supply path 10 to at least one downstream stage 16 of the plurality of stages 6. Process P2B, which can be performed contemporaneously with P2A, or before or after P2A, can include diverting a second portion of the working fluid around the at least one downstream stage 16. In some cases, in process P3, following processes P2A and P2B, the first portion and the second portion of the working fluid can be mixed (e.g., in axial bypass path 18) to form a bucket supply fluid for use by the turbine 28. In some cases, as described herein, the second portion of the working fluid is diverted along a radial outer dimension 20 of the plurality of stages 6.

Figure 3:
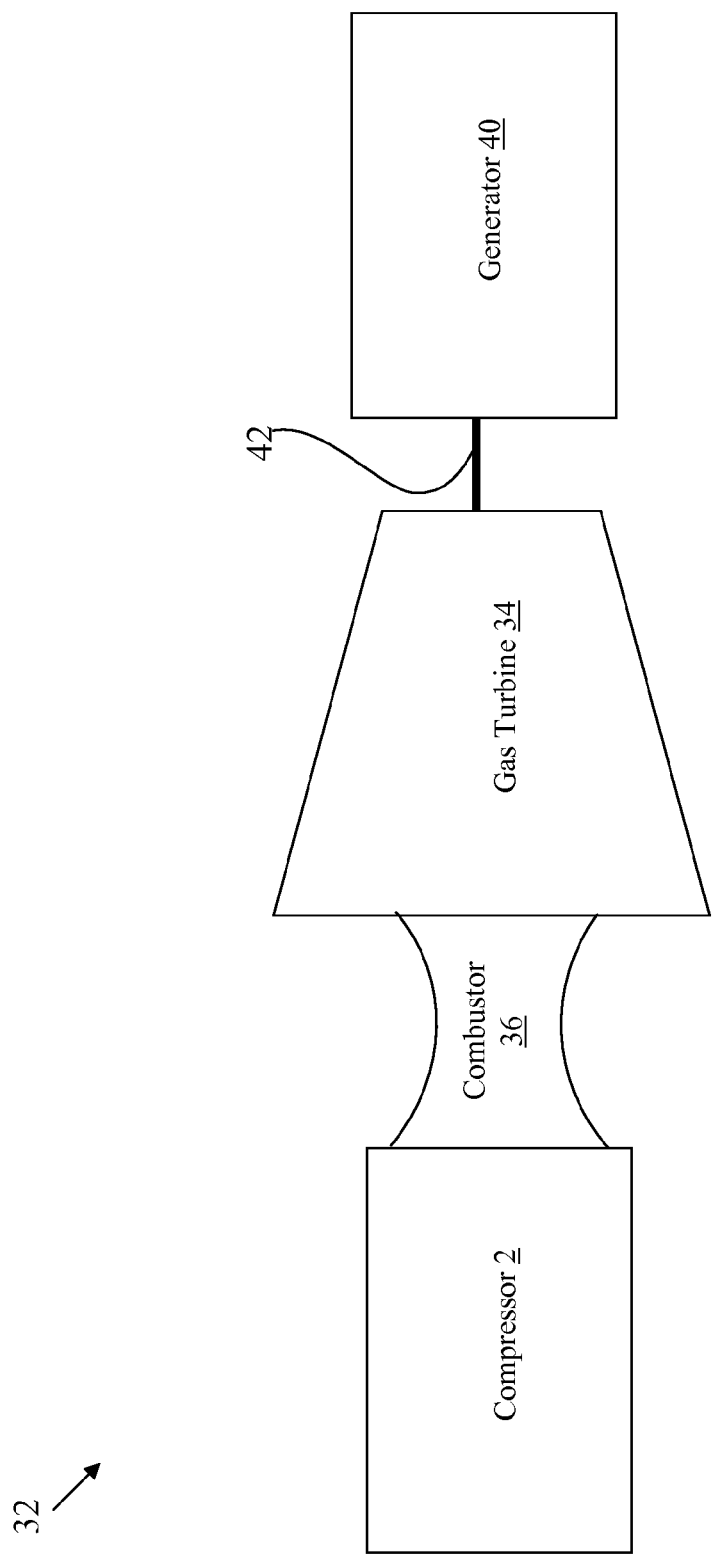
FIG. 3 shows a schematic view of a gas turbine system according to aspects of the invention.

FIG. 3 shows a schematic view of a gas turbine system 32 according to aspects of the invention. As shown, the gas turbine system 32 can include the compressor 2 and a gas turbine 34 (such as turbine 28 of FIG. 1) coupled to the compressor 2. The gas turbine 34 can include any conventional gas turbine 34 capable of converting the fluid motion of heated gas into rotational motion. As is known in the art, the compressor 2 can compress a fluid such as air, which can be combined with fuel in a combustor 36 for burning, which thereby produces a heated gas that can perform mechanical work in the gas turbine 34 (e.g., by causing rotation of a shaft coupled to turbine blades). In some cases, as is known in the art, the gas turbine 34 can be connected (e.g., mechanically coupled) with a generator 40 (e.g., via conventional shaft 42), to form a gas turbine system capable of, e.g., generating electrical power. It is further understood that the gas turbine 34 and/or generator 40 could be coupled to a conventional steam turbine system to form a combined cycle power generation system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compressor comprising:
a rotor having a plurality of stages, each of the plurality of stages including a set of radially extending rotor wheels;
a working fluid supply path for providing working fluid to each of the plurality of stages for compression by each set of radially extending rotor wheels;
a purge circuit for diverting a first portion of the working fluid from an upstream portion of the working fluid supply path to at least one downstream stage of the plurality of stages; and
a substantially axial bypass path bypassing the at least one downstream stage, the substantially axial bypass path for diverting a second portion of the working fluid around the at least one downstream stage,
wherein the substantially axial bypass path is fluidly connected with the purge circuit and diverts the second portion of the working fluid from a location upstream of the purge circuit to a location downstream of the at least one downstream stage, wherein the second portion of the working fluid is joined with the first portion of the working fluid in the axial bypass path to form a bucket supply fluid, and
wherein the substantially axial bypass path and the purge circuit each extend along a radial length of respective sets of the radially extending rotor wheels.

2. The compressor of claim 1, wherein the substantially axial bypass path extends along a radial outer dimension of the plurality of stages.

3. The compressor of claim 1, wherein the upstream portion of the working fluid supply path is an eleventh stage of the compressor, and wherein the at least one downstream stage includes a twelfth, a thirteenth and a fourteenth stage of the compressor.

4. The compressor of claim 1, wherein the axial bypass path is fluidly connected with an outlet of the compressor.

5. A gas turbine system comprising:
a turbine; and
a compressor fluidly connected to the turbine, the compressor including:
a rotor having a plurality of stages, each of the plurality of stages including a set of radially extending rotor wheels;
a working fluid supply path for providing working fluid to each of the plurality of stages for compression by each set of radially extending rotor wheels;
a purge circuit for diverting a first portion of the working fluid from an upstream portion of the working fluid supply path to at least one downstream stage of the plurality of stages; and
a substantially axial bypass path bypassing the at least one downstream stage, the substantially axial bypass path for diverting a second portion of the working fluid around the at least one downstream stage,
wherein the substantially axial bypass path is fluidly connected with the purge circuit and diverts the second portion of the working fluid from a location upstream of the purge circuit to a location downstream of the at least one downstream stage, wherein the second portion of the working fluid is joined with the first portion of the working fluid in the axial bypass path to form a bucket supply fluid, and
wherein the substantially axial bypass path and the purge circuit each extend along a radial length of respective sets of the radially extending rotor wheels.

6. The gas turbine system of claim 5, wherein the substantially axial bypass path extends along a radial outer dimension of the plurality of stages.

7. The gas turbine system of claim 5, wherein the upstream portion of the working fluid supply path is an eleventh stage of the compressor, and wherein the at least one downstream stage includes a twelfth, a thirteenth and a fourteenth stage of the compressor.

8. The gas turbine system of claim 5, wherein the axial bypass path is fluidly connected with an outlet of the compressor, the outlet of the compressor fluidly connected with an inlet of the turbine.

9. The gas turbine system of claim 5, further comprising a generator connected with the turbine.

* * * * *